May 5, 1942.
G. A. PEPLE, JR
2,281,615
METHOD AND APPARATUS FOR AIR CONDITIONING
Filed Aug. 9, 1939
2 Sheets-Sheet 1
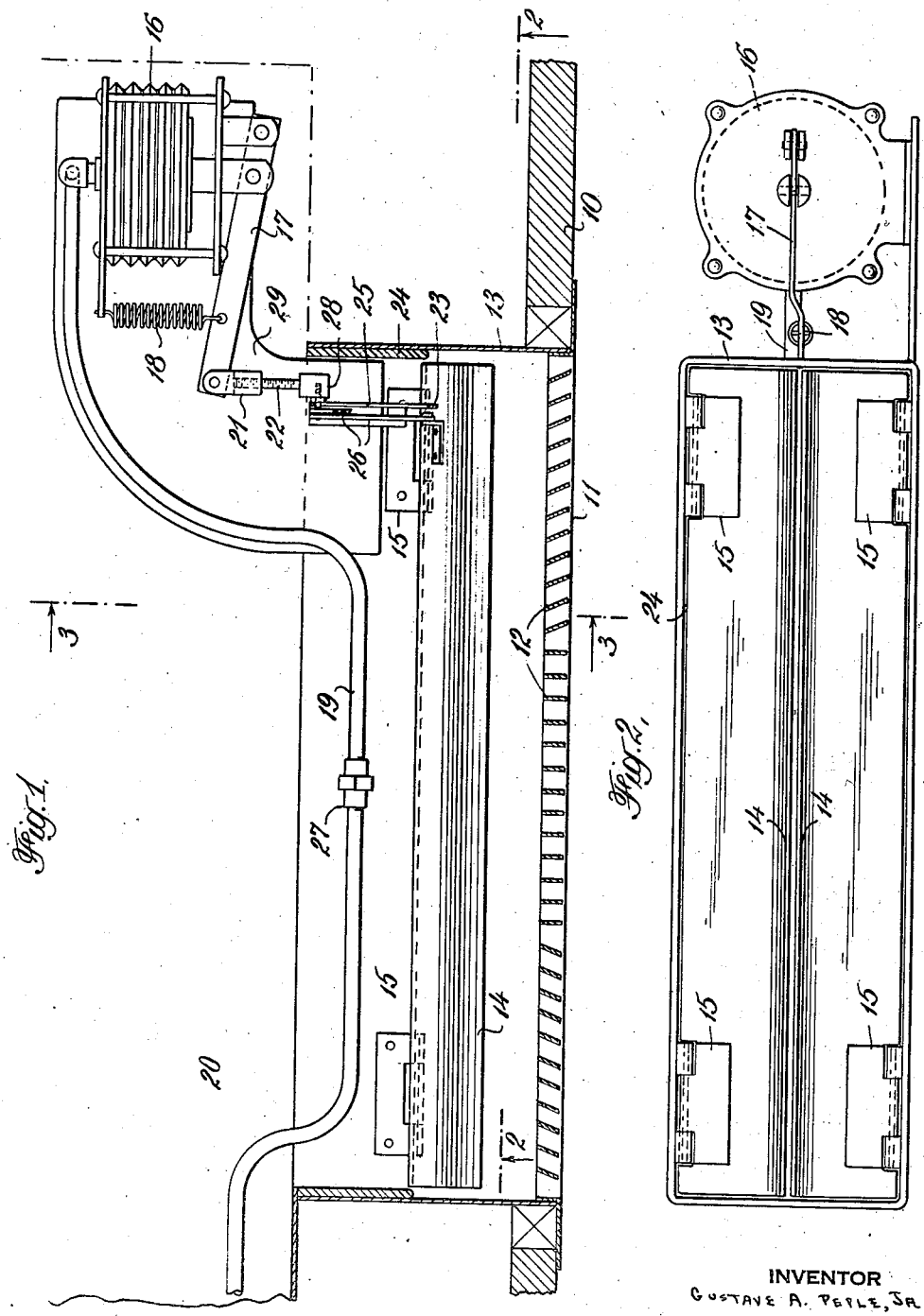
INVENTOR
GUSTAVE A. PEPLE, JR.
BY
Pennie, Davis, Marvin Edmonds
his ATTORNEYS May 5, 1942.  G. A. PEPLE, JR  2,281,615
METHOD AND APPARATUS FOR AIR CONDITIONING
Filed Aug. 9, 1939  2 Sheets-Sheet 2
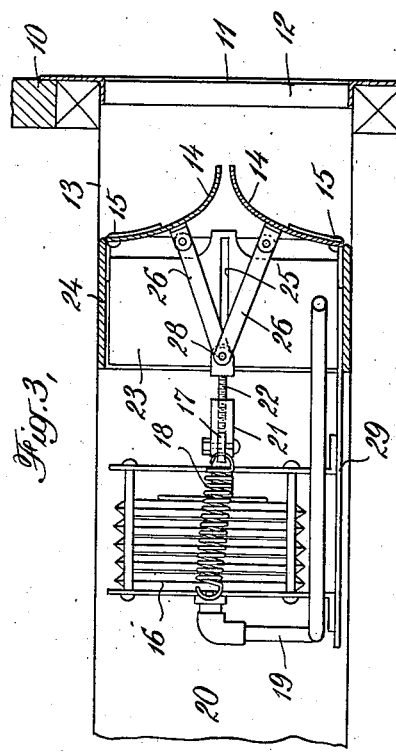
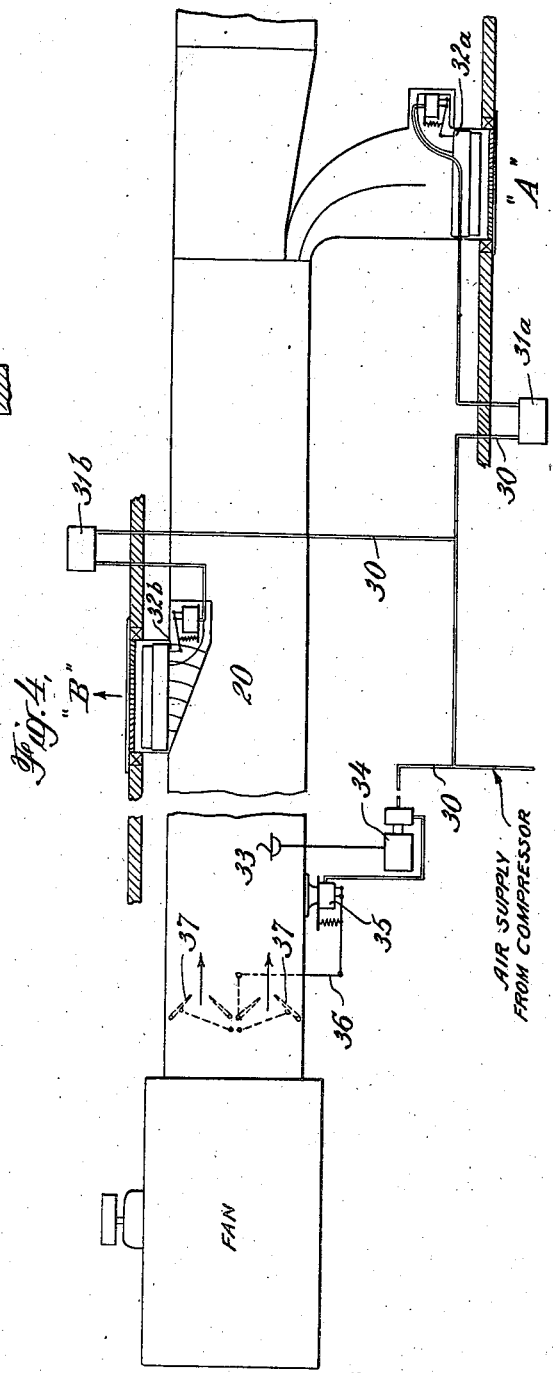
INVENTOR
Gustave A. Peple, Jr.
BY
Pennie, Davis, Marvin & Edmonds
his ATTORNEYS Patented May 5, 1942

2,281,615

UNITED STATES PATENT OFFICE 2,281,615

METHOD AND APPARATUS FOR AIR CONDITIONING

Gustave Adolphus Peple, Jr., Richmond, Va.

Application August 9, 1939, Serial No. 289,136

8 Claims. (Cl. 98—40)

This invention relates to air-conditioning of rooms, auditoriums and chambers or compartments generally which are adapted for human use and occupancy. More particularly this invention consists in an improved method and apparatus for the control of atmospheric conditions with marked economy of installation and operation while maintaining the highest standards of comfort and health, particularly in the avoidance of drafts.

The primary object of my invention is to permit the volume of air circulated to be varied with the demands for heating or cooling, with resulting economies under average conditions of small demand, without adversely affecting the flow currents of air in the rooms supplied, thus avoiding undesirable drafts under all conditions.

An additional object is to attain the foregoing in each room supplied, while the supply to each room is varied to meet its individual demands.

The importance of maintaining a predetermined pattern of flow currents in an air-conditioned chamber to avoid the creation of unhealthful and uncomfortable drafts has long been recognized. The customary installation of air-conditioning apparatus meets this requirement by supplying to each outlet duct a constant volume of circulating air, meeting the demands for heating or cooling by varying the temperature of the air supplied. When these demands are small, there is a great waste of energy in recirculating a large volume of air which has no conditioning effect whatsoever.

What I propose to overcome this difficulty is to provide each room with an inlet duct fitted with an improved positive control, constant-velocity damper arranged to vary the volume of air admitted in response to an individual thermostat in that room. This damper maintains the velocity of the air discharged through it at the predetermined rate necessary to secure the proper throw and diffusion of the air in the room. Thus the flow pattern of the air is maintained and objectionable drafts avoided.

In order to insure that the velocity of air passing through my improved damper will remain constant despite variations in volume, the static pressure of the air in the supply duct must be maintained constant. In order to accomplish this I control the output of the supply fan by a static pressure regulator in the main supply duct located between the fan and the first individual room duct. Thus the volume of air called for by the sum of the openings of the individual room dampers according to the demands for conditioning in each room controls the volume of air supplied to the main duct, in which the static pressure regulator insures a constant pressure behind each constant-velocity room damper.

For a complete understanding of the method and apparatus by which the desired results are accomplished, attention is directed to the accompanying drawings and specification illustrating and describing a satisfactory embodiment of my invention, the spirit and scope which is more precisely defined in the appended claims.

In the drawings:

Fig. 1 is a horizontal section through a room duct installation showing my constant-velocity damper and its control mechanism;

Fig. 2 is a vertical section taken on the line 2—2 of Fig. 1;

Fig. 3 is a vertical section taken on the line 3—3 of Fig. 1; and

Fig. 4 is a schematic diagram showing the operation of a complete installation of my invention.

Figs. 1, 2 and 3 show the construction of my positively controlled, constant-velocity damper. The room duct 13 is set into the wall 10 of the room to be conditioned and the forward face thereof is fitted with a standard grille 11 with adjustable or fixed directional louvres 12. It leads from the main duct 20. Removably fastened to the duct 13 is the damper frame 24, to the top and bottom of which are hinged, by the hinges 15, two curved horizontal damper blades 14. The blades 14 are so positioned that when fully open they will come as close as possible to the louvres 12. The blades 14 are curved as shown in cross-section in Fig. 3 in such a way that no matter what their position they always afford a smooth, burble-free passage for the treated air passing between them from the supply duct 20.

The damper blades 14 are actuated by the damper motor 16 and return spring 18 through a linkage of which 17 is the main arm. To this arm the damper blade toggle links 26 are connected by the main arm pivot link 21 and toggle pivot link 28, the pivot links 21 and 28 being adjustably connected to each other by the screw 22. By means of this screw 22 when the main arm 17 is in the fully retracted position, as shown in the drawings, the minimum opening of the damper blades 14 can be fixed. The toggle pivot link 28 is slidably fastened to the guide plate 23, which is attached to the damper frame 24, and moves as it is actuated by the arm 17 along the guide slot 25 in the plate 23.

The damper motor 16 is actuated by compressed air supplied to it through the pipe 19, the air pressure in which is controlled by a thermostat in the room to which the casing 13 leads from the main duct 20. Thus, when the temperature variations in that room call for increased flow of heating or cooling air, as the case may be, the thermostat operates to increase the air pressure actuating the motor 16. This motor drives the arm 17 against the resistance of return spring 18, forcing open the damper blades 14 through the linkage described and admitting a greater volume of treated air.

The curvature of the blades 14 is so arranged that no matter what their position the flow of air through them will be substantially unimpeded and its velocity will remain constant, its volume varying proportionally to the amount of the opening, so long as the static pressure of the air in the main duct 20 is constant also. Thus, the predetermined pattern of the air flow in the room will remain substantially the same for any given setting of the directional louvres 12 regardless of changes in the volume of air entering the room.

The damper motor 16 is supported by the plate 29 attached to the damper frame 24. The compressed air pipe 19 is fitted with the pipe coupling 27 directly behind the middle of the damper blades 14, where it is readily accessible from the front. When grille 11 is removed and pipe connection 27 broken, the damper frame 24 may be readily removed from the room duct 13 carrying with it the entire damper assembly. This removal is facilitated, and irregularities in the room duct 13 compensated for, it has been found in practice, if a ⅛ inch felt strip is inserted between frame 24 and duct 13 all around, a detail not added to the drawings. The unit construction of my constant-velocity damper greatly cheapens manufacture and facilitates installation and repair.

In Fig. 4 I show schematically the operation of my positive control, constant-velocity damper in a working air conditioning sytsem. In this system of my invention, the separate rooms or spaces to be conditioned are provided with one or more inlet grilles through which access is had ot the main supply duct through a constant velocity damper assembly.

In Fig. 4, A and B represent two individual rooms having inlet ducts to them from the main supply duct 20 through the constant-velocity damper assemblies 32a and 32b respectively. The damper motors on these assemblies are controlled by the thermostats 31a and 31b within the rooms A and B respectively. These thermostats operate to control the pressure of the air supplied to the separate room damper motors by the air supply pipes 30. In the main duct 20 between the fan and the first individual room outlet is mounted the fan discharge damper 37. This damper is controlled by the damper motor 35 through the linkage 36. The pressure of the compressed air supplied to the damper motor 35 by the air supply pipe 38 is so regulated by the control device 34 by means of the static pressure regulator 33 located in the main duct 20 just beyond the discharge damper 37 from the fan that the static pressure is that duct is held substantially constant.

Thus, the operation of my system is as follows: Let us suppose that thermostat 31a in the room A calls for an increased supply of cooling air. This operates to open the constant-velocity damper in the assembly 32a, as hereinbefore described, increasing the volume of air discharged from the main duct 20. This in turn would result in a lowering of the static pressure in that duct, but by operation of the static pressure regulator 33 the fan discharge damper 37 is opened sufficiently to maintain a constant static pressure in duct 20. Thus, the velocity of air discharged through the damper assembly 32a into the room A remains the same although its volume has increased. Similarly a change in position of the damper blades in the assembly 32b because of temperature changes in the room B will affect the static pressure in the duct 20 which in turn causes a compensating adjustment in the fan discharge damper 37.

In effect, therefore, the fan discharge damper 37 regulates the volume of air supplied to the main duct 20 in accordance with the algebraic sum of the demands of the rooms A and B or as many others as may be supplied from the duct 20, all the while maintaining a constant static pressure in that duct. By this means, my improved positive control, constant-velocity dampers function to maintain the flow pattern of the air discharged into the various rooms, with no objectionable drafts caused despite wide variations in the volume of air supplied. Thus in periods of low demand, a small volume of air flows through the main duct 20 with resulting economies in the operation of the system.

Certain variations that may be made in installations of my invention not shown in the precise embodiment selected for illustration will be apparent to all skilled in the art when the spirit and scope of invention as defined in the appended claims are understood. For example, the damper motor 16 and return spring 18 may be so arranged that the spring operates to keep the blades at their maximum and not minimum opening. Or the fan output control mechanism 34 regulated by the static pressure regulator 33 may operate not on the fan discharge damper 37, but on a fan intake damper, or even on the speed or pitch of the fan itself.

Moreover, it is a positive advantage of my system of air-conditioning that the various damper-control motors operate entirely without direct interaction of controls or motive power. The several motors, therefore, need not be driven, as I have shown, by a common source of compressed air, but instead, electrically operated damper motors may be used, greatly cheapening installation costs, particularly in existing structures.

I claim:
1. The method of conditioning the air within a room or space which comprises supplying treated air from a source of supply to said room in a stream of predetermined direction, maintaining said supply at a constant static pressure, positively varying the volume of treated air in said stream in response to controls located in the room so as to maintain a predetermined atmospheric condition within the room, and maintaining the velocity and direction of the stream of treated air constant and free from eddy currents independently of the volume of air in said stream.

2. The method of controlling the temperature of the air within a room or space which comprises supplying hot or cold air as the season may require from a source of supply to said room in a stream of predetermined direction, maintaining said supply at a constant static pressure, varying the volume of air in said stream in response to controls located in the room so as to maintain a predetermined room temperature, and maintaining the velocity of the stream of air constant and free from eddy currents independently of the volume of air in said stream.

3. The method of conditioning the air within a plurality of rooms or spaces which comprises supplying treated air to a common duct at a constant static pressure and passing that air into the individual rooms or spaces through auxiliary ducts, regulating the volume of the streams of treated air passing through these auxiliary ducts positively in response to controls located in said rooms or spaces to maintain predetermined atmospheric conditions individually in each room or space, and maintaining the velocity and direction of the streams of treated air constant and free from eddy currents independently of the volumes of air in said streams.

4. The method of controlling the temperature of the air within a plurality of rooms or spaces which comprises supplying hot or cold air as the season may require to a common duct at a constant static pressure and passing that air into the individual rooms or spaces through auxiliary ducts, regulating the volume of the streams of air passing through these auxiliary ducts positively in response to controls located in said rooms or spaces to maintain a predetermined temperature individually in each room or space, and maintaining the velocity and direction of the streams of treated air constant and free from eddy currents independently of the volumes of air in said streams.

5. In air-conditioning apparatus, a duct leading into the space to be conditioned, a damper for controlling the flow of air therethrough, said damper comprising a pair of curved vanes movable toward and away from each other, means for positively and equally moving said vanes, said vanes having their convex side toward the incoming air and so positioned that a tangent to the curve at the point on each vane nearest the opposite vane is substantially parallel to the axis of the duct and the curvature of the vanes being such that the volume of air passing through the opening under constant duct pressure is at a constant velocity and substantially free from eddy currents at all positions of adjustment of said vanes.

6. In air-conditioning apparatus, a duct leading into the space to be conditioned, a damper for controlling the flow of air therethrough, said damper comprising a pair of curved vanes movable toward and away from each other, means for positively and equally moving said vanes, said vanes having their convex side toward the incoming air and so positioned that a tangent to the curve at the point on each vane nearest the opposite vane is substantially parallel to the axis of the duct and the curvature of the vanes being such that the volume of air passing through the opening under constant duct pressure is at a constant velocity and substantially free from eddy currents at all positions of adjustment of said vanes, and a grill having directional louvers at the discharge end of said duct, said grill being placed as close to said damper as the necessary operating clearance of the vanes permit.

7. In air-conditioning apparatus, a duct leading into the space to be conditioned, a damper for controlling the flow of air therethrough, said damper comprising a pair of curved vanes hinged at opposite sides of said duct and movable toward and away from each other, means for positively and equally moving said vanes, said vanes having their convex side toward the incoming air and so positioned that a tangent to the curve at the point on each vane nearest the opposite vane is substantially parallel to the axis of the duct and the curvature of the vanes being such that the volume of air passing through the opening under constant duct pressure is at constant velocity and substantially free from eddy currents at all positions of adjustment of said vanes, means for supplying conditioned air to said duct and means for maintaining a constant duct pressure.

8. In air-conditioning apparatus for a plurality of rooms, a main duct, branch ducts leading to said rooms, means for supplying conditioned air to said main duct and maintaining a constant static pressure there, a damper for controlling the flow of air through each of said branch ducts, said damper comprising a pair of curved vanes hinged at opposite sides of said duct and movable toward and away from each other, means for positively and equally moving said vanes, said vanes having their convex side toward the incoming air and so positioned that a tangent to the curve at the point on each vane nearest the opposite vane is substantially parallel to the axis of the duct and the curvature of the vanes being such that a volume of air passing through the opening under constant duct pressure is at constant velocity and substantially free from eddy currents at all positions of adjustment of said vanes.

GUSTAVE ADOLPHUS PEPLE, Jr.